(12) United States Patent
Miller et al.

(10) Patent No.: US 8,765,851 B2
(45) Date of Patent: Jul. 1, 2014

(54) FREE RADICAL INITIATOR MODIFIED HOT MELT ADHESIVE COMPOSITION INCLUDING FUNCTIONALIZED POLYETHYLENE AND PROPYLENE-ALPHA-OLEFIN POLYMER

(75) Inventors: Richard A. Miller, White Bear Lake, MN (US); Kevin Davis, North St. Paul, MN (US); Stephen M. Willging, Minneapolis, MN (US); Sharf U. Ahmed, Woodbury, MN (US); Timothy W. Roska, Forest Lake, MN (US)

(73) Assignee: H.B. Fuller Company, St. Paul, MN (US)

(*) Notice: Subject to any disclaimer, the term of this patent is extended or adjusted under 35 U.S.C. 154(b) by 168 days.

(21) Appl. No.: 13/529,269

(22) Filed: Jun. 21, 2012

(65) Prior Publication Data

US 2012/0329929 A1 Dec. 27, 2012

Related U.S. Application Data

(60) Provisional application No. 61/501,585, filed on Jun. 27, 2011.

(51) Int. Cl.
- *C09J 123/30* (2006.01)
- *C09J 123/14* (2006.01)
- *C09J 151/06* (2006.01)

(52) U.S. Cl.
CPC .............. *C09J 123/14* (2013.01); *C09J 151/06* (2013.01)
USPC ......................................................... 524/275

(58) Field of Classification Search
CPC .............................. C09J 123/14; C09J 151/06
USPC ......................................................... 524/275
See application file for complete search history.

(56) References Cited

U.S. PATENT DOCUMENTS

| | | |
|---|---|---|
| 3,539,481 A | 11/1970 | Parker |
| 3,862,265 A | 1/1975 | Steinkamp et al. |
| 3,882,194 A | 5/1975 | Krebaum et al. |
| 3,987,122 A | 10/1976 | Bartz et al. |
| 4,105,718 A | 8/1978 | Hall |
| 4,112,208 A | 9/1978 | McConnell et al. |
| 4,120,916 A | 10/1978 | Meyer, Jr. et al. |
| 4,140,733 A | 2/1979 | Meyer et al. |
| 4,217,428 A | 8/1980 | McConnell et al. |
| 4,477,532 A | 10/1984 | Schmukler et al. |
| 4,506,056 A | 3/1985 | Gaylord |
| 4,567,223 A | 1/1986 | Ames |
| 4,906,690 A | 3/1990 | Hasenbein et al. |
| 5,041,482 A | 8/1991 | Ornsteen et al. |
| 5,041,484 A | 8/1991 | Atwell et al. |
| 5,185,398 A | 2/1993 | Kehr et al. |
| 5,241,014 A | 8/1993 | Kehr et al. |
| 5,302,675 A | 4/1994 | Sustic et al. |
| 5,441,999 A | 8/1995 | Jarvis et al. |
| 5,455,111 A | 10/1995 | Velasquez Urey |
| 5,468,807 A | 11/1995 | Tsurutani et al. |
| 5,534,575 A | 7/1996 | Foster et al. |
| 5,637,410 A | 6/1997 | Bonner et al. |
| 5,723,546 A | 3/1998 | Sustic et al. |
| 5,783,629 A | 7/1998 | Srinivasan et al. |
| 5,955,547 A | 9/1999 | Roberts et al. |
| 5,986,009 A | 11/1999 | Thoen et al. |
| 6,080,818 A | 6/2000 | Thakker et al. |
| 6,100,351 A | 8/2000 | Sun et al. |
| 6,107,430 A | 8/2000 | Dubois et al. |
| 6,143,825 A | 11/2000 | Beren et al. |
| 6,184,327 B1 | 2/2001 | Weng et al. |
| 6,248,832 B1 | 6/2001 | Peacock |
| 6,395,791 B1 | 5/2002 | Chaudhary et al. |
| 6,448,333 B1 | 9/2002 | Rodriguez et al. |
| 6,475,633 B1 | 11/2002 | Robert et al. |
| 6,552,110 B1 | 4/2003 | Yalvac et al. |
| 6,573,350 B1 | 6/2003 | Markel et al. |
| 6,653,385 B2 | 11/2003 | Wang et al. |
| 6,656,601 B1 | 12/2003 | Kawachi et al. |
| 6,747,114 B2 | 6/2004 | Karandinos et al. |
| 6,797,774 B2 | 9/2004 | Kijima |
| 6,872,279 B1 | 3/2005 | Kolowrot et al. |
| 6,936,635 B1 | 8/2005 | Da Silva |
| 6,960,635 B2 | 11/2005 | Stevens et al. |
| 7,067,585 B2 | 6/2006 | Wang et al. |
| 7,223,814 B2 | 5/2007 | Martin et al. |

(Continued)

FOREIGN PATENT DOCUMENTS

| | | |
|---|---|---|
| DE | 102008019802 A1 | 10/2009 |
| EP | 0 442 045 B1 | 10/1993 |

(Continued)

OTHER PUBLICATIONS

Rextac MSDS RT2765 CS212 (Feb. 14, 2011) (4 pages).
Rextac Product Specifications, http://www.rextac.com/index.pbp?q=node/21, (2 pages).
Rextac RT2115 product data sheet (Apr. 1998) (1 page).
Rextac RT2730 product data sheet (Apr. 1998) (1 page).

(Continued)

*Primary Examiner* — Doris Lee
(74) *Attorney, Agent, or Firm* — Kirsten Stone; Allison Johnson

(57) ABSTRACT

A hot melt adhesive composition that includes a first copolymer that includes the reaction product of a functionalized polyethylene, a propylene-alpha-olefin polymer that includes at least 50 mole % propylene and has a viscosity of no greater than 10,000 centipoise at 190° C., a ratio of z average molecular weight ($M_z$) to number average molecular weight ($M_n$) ($M_z/M_n$) of greater than 20, and a ratio of $M_z$ to weight average molecular weight ($M_w$) ($M_z/M_w$) of greater than 3.0, and a free radical initiator.

42 Claims, No Drawings

(56) References Cited

U.S. PATENT DOCUMENTS

| | | |
|---|---|---|
| 7,232,871 B2 | 6/2007 | Datta et al. |
| 7,262,251 B2 | 8/2007 | Kanderski et al. |
| 7,294,681 B2 | 11/2007 | Jiang et al. |
| 7,309,747 B2 | 12/2007 | Minami et al. |
| 7,408,007 B2 | 8/2008 | Roberts et al. |
| 7,459,503 B2 | 12/2008 | Kanamaru et al. |
| 7,517,579 B2 | 4/2009 | Campbell et al. |
| 7,521,507 B2 | 4/2009 | Lewtas et al. |
| 7,524,910 B2 | 4/2009 | Jiang et al. |
| 7,541,402 B2 | 6/2009 | Abhari et al. |
| 7,550,528 B2 | 6/2009 | Abhari et al. |
| 7,683,134 B2 | 3/2010 | Roberts et al. |
| 7,700,707 B2 | 4/2010 | Abhari et al. |
| 7,750,078 B2 | 7/2010 | Curry |
| 7,786,032 B2 | 8/2010 | Zhou et al. |
| 7,812,085 B2 | 10/2010 | Tse et al. |
| 7,968,665 B2 | 6/2011 | Minami et al. |
| 8,076,407 B2 | 12/2011 | Ellis et al. |
| 8,242,198 B2 | 8/2012 | Jiang et al. |
| 8,263,707 B2 | 9/2012 | Datta et al. |
| 2002/0007033 A1 | 1/2002 | Karandinos et al. |
| 2002/0127389 A1 | 9/2002 | Hanada et al. |
| 2003/0096896 A1 | 5/2003 | Wang et al. |
| 2003/0181554 A1 | 9/2003 | Faissat et al. |
| 2007/0028118 A1 | 2/2007 | Brown et al. |
| 2007/0042193 A1 | 2/2007 | Wang et al. |
| 2007/0129498 A1* | 6/2007 | Curry ............................ 525/242 |
| 2009/0105407 A1 | 4/2009 | Karjala et al. |
| 2009/0203847 A1 | 8/2009 | Ellis et al. |
| 2009/0306281 A1 | 12/2009 | Tancrede et al. |
| 2010/0059178 A1 | 3/2010 | Jiang et al. |
| 2010/0132886 A1 | 6/2010 | Rodriguez et al. |
| 2010/0305259 A1 | 12/2010 | Rodriguez et al. |
| 2011/0054117 A1 | 3/2011 | Hall et al. |
| 2011/0076905 A1 | 3/2011 | Mussig et al. |
| 2011/0229729 A2 | 9/2011 | Laiho et al. |
| 2012/0171466 A1 | 7/2012 | Urbach et al. |

FOREIGN PATENT DOCUMENTS

| | | |
|---|---|---|
| EP | 1 477 499 | 11/2004 |
| EP | 1 498 432 | 1/2005 |
| EP | 2 050 770 | 4/2009 |
| EP | 2 253 648 | 11/2010 |
| EP | 1 833 939 | 3/2011 |
| EP | 2 281 859 | 9/2011 |
| GB | 1 267 472 | 4/1970 |
| WO | WO 98-03603 | 1/1998 |
| WO | WO 98-42780 | 10/1998 |
| WO | WO-99/20664 | 4/1999 |
| WO | WO 99-20701 | 4/1999 |
| WO | WO-00/00520 | 1/2000 |
| WO | WO-00/01745 | 1/2000 |
| WO | WO 00-37514 | 6/2000 |
| WO | WO 01-46278 | 6/2001 |
| WO | WO 03-033612 A1 | 4/2003 |
| WO | WO95/10575 | 4/2003 |
| WO | WO 03-037514 | 5/2003 |
| WO | WO 03-096896 | 11/2003 |
| WO | WO2005/100501 | 10/2005 |
| WO | WO2005/105941 | 11/2005 |
| WO | WO 2005-111132 A1 | 11/2005 |
| WO | WO2006/069205 | 6/2006 |
| WO | WO2007/002177 | 1/2007 |
| WO | WO2007/142749 | 12/2007 |
| WO | WO 2010-132886 | 11/2010 |
| WO | WO 2011-022523 A2 | 2/2011 |
| WO | WO2011/059431 | 5/2011 |
| WO | WO-2012/068576 | 7/2012 |

OTHER PUBLICATIONS

Rextac RT2780 product data sheet (Apr. 1998)(1 page).
Rextac RT2788 product data sheet (Sep. 2010) (1 page).
Eastman Product Literature entitled, "Epolene Waxes as Petroleum Wax Modifiers" (Jul. 1997) (10 pages).

* cited by examiner

FREE RADICAL INITIATOR MODIFIED HOT MELT ADHESIVE COMPOSITION INCLUDING FUNCTIONALIZED POLYETHYLENE AND PROPYLENE-ALPHA-OLEFIN POLYMER

CROSS-REFERENCE TO RELATED APPLICATIONS

This application claims the benefit of U.S. Provisional Application No. 61/501,585 filed Jun. 27, 2011, which is incorporated herein.

BACKGROUND

The invention is directed to formulating propylene-alpha-olefin polymer-based hot melt adhesive compositions.

Hot melt adhesive compositions are used in a variety of applications that require bonding two substrates together including, e.g., packaging applications (e.g., corrugated board and cardboard), nonwoven applications (e.g., disposable articles), bookbinding and footwear manufacturing. A hot melt adhesive composition is generally applied in a molten state and forms a bond as it cools and solidifies. The time required for a hot melt adhesive to cool to the point where it has enough strength to form a bond is referred to as the "set time." Set time is an important parameter in applications that require high speed processing operations such as packaging and book binding operations. For many packaging applications, the bond needs to form rapidly or the resulting package will be poorly sealed or even unsealed.

It is important that adhesives used in packaging applications exhibit good bond strength over a wide temperature range and fast set times.

Amorphous polypropylene polymers have been formulated in hot melt adhesive compositions for a variety of applications. Many amorphous polypropylene polymers exhibit a long open time, are quite tacky immediately after solidifying from a molten state, and remain tacky for an undesirable period of time after solidifying. These properties are undesirable for applications that require short open times and non-tacky properties after solidification.

SUMMARY

In one aspect, the invention features a hot melt adhesive composition that includes a first copolymer that includes the reaction product of a functionalized polyethylene, a propylene-alpha-olefin polymer comprising at least 50 mole % propylene and having a viscosity of no greater than 10,000 centipoise at 190° C., a ratio of z average molecular weight (Mz) to number average molecular weight (Mn) (Mz/Mn) of greater than 20, and a ratio of Mz to weight average molecular weight (Mw) (Mz/Mw) of greater than 3.0, and a free radical initiator. In one embodiment, the adhesive composition has a viscosity of no greater than about 2,000 centipoise at 177° C. In another embodiment, the adhesive composition has a viscosity of from about 400 to about 2,000 centipoise at 177° C. In some embodiments, the adhesive composition exhibits a fiber tearing bond at −29° C. (Celsius) and at +60° C. In other embodiments, the adhesive composition exhibits at least 50% fiber tear at −29° C. and at +60° C.

In some embodiments, the first copolymer is formed from of at least 2% by weight of the functionalized polyethylene based on the weight of the first copolymer. In other embodiments, the first copolymer is formed from of at least about 4% by weight of the functionalized polyethylene based on the weight of the first copolymer. In other embodiments, the first copolymer is formed from at least 10% by weight of the functionalized polyethylene based on the weight of the first copolymer. In one embodiment, the first copolymer includes the reaction product of at least 2% by weight of maleated polyethylene and at least about 80% by weight of propylene-alpha-olefin polymer. In another embodiment, the first copolymer includes the reaction product of at least about 4% by weight of maleated polyethylene and at least about 80% by weight of propylene-alpha-olefin polymer. In another embodiment, the first copolymer includes the reaction product of at least 10% by weight maleated polyethylene and at least about 85% by weight propylene-alpha-olefin olefin polymer.

In some embodiments, the adhesive composition is homogeneous after aging for 96 hours at 177° C.

In one embodiment, the adhesive composition exhibits a single thermal melt transition temperature when tested using differential scanning calorimetry.

In another embodiment, the adhesive composition exhibits an initial Gardner color of no greater than 3. In some embodiments, the adhesive composition exhibits a Gardner color after aging for 72 hours at 177° C. of no greater than 5.

In one embodiment, the free radical initiator includes peroxide.

In some embodiments, the propylene-alpha-olefin polymer includes at least one of ethylene, butene, pentene, hexene, heptene, octene, nonene, decene, and dodecene. In other embodiments, the propylene-alpha-olefin polymer includes at least 25 mole % butene.

In one embodiment, the adhesive composition further includes at least one of Fisher Tropsch wax, polyethylene wax, polypropylene wax, and maleated polypropylene wax. In other embodiments, the functionalized polyethylene includes maleated polyethylene and the composition further includes at least one of Fischer Tropsch wax, polyethylene wax, and maleated polypropylene wax. In other embodiments, the functionalized polyethylene includes maleated polyethylene and the composition further includes a Fischer Tropsch wax. In some embodiments, the composition further includes an olefin polymer. In another embodiment, the adhesive composition further includes at least about 5% by weight wax. In some embodiments, the adhesive composition further includes at least about 5% by weight wax selected from the group consisting of polyethylene wax, maleated polypropylene wax, and Fischer Tropsch wax.

In one embodiment, the adhesive composition exhibits a set time of less than 15 seconds. In another embodiment, the adhesive composition exhibits a set time of less than 10 seconds. In other embodiments, the adhesive composition exhibits a set time of less than 8.5 seconds.

In other embodiments, the first copolymer includes the reaction product of at least 2% by weight maleated polyethylene and at least about 80% by weight propylene-alpha-olefin polymer, the adhesive composition further includes at least about 5% by weight wax, and the adhesive composition has a viscosity no greater than 2,000 centipoise at 177° C. In another embodiment, the first copolymer includes the reaction product of at least 3% by weight maleated polyethylene and at least about 80% by weight propylene-alpha-olefin polymer, the adhesive composition further includes at least about 5% by weight wax, and the adhesive composition has a viscosity no greater than 2,000 centipoise at 177° C.

In some embodiments, the adhesive composition exhibits a Mz/Mn of greater than 18, and a Mz/Mw of from 2.3 to no greater than 6. In other embodiments, the adhesive composition exhibits a Mz/Mn of at least 27 and a Mz/Mw of from 2.3 to no greater than 4.

In other embodiments, the adhesive composition further includes tackifying agent. In some embodiments, the adhesive composition further includes at least 15% by weight tacicifying agent. In other embodiment, the adhesive composition further includes from 15% by weight to about 30% by weight tackifying agent. In another embodiment, the first copolymer is formed from a reaction mixture that further includes a polyfunctional acid.

In one embodiment, the adhesive composition includes at least about 55% by weight (or even at least about 70% by weight) of the copolymer and further includes a tackifying agent and at least one of Fischer Tropsch wax, polyethylene wax, polypropylene wax, and maleated polypropylene wax.

In another aspect, the invention features a method of making a hot melt adhesive composition, the method including heating a mixture that includes at least about 80% by weight propylene-alpha-olefin polymer that includes at least 50 mole % propylene, the propylene-alpha-olefin polymer being derived from propylene and an olefin that includes at least one of two carbon atoms and four carbon atoms, and having a viscosity of no greater than 10,000 centipoise at 190° C., a ratio of z average molecular weight (Mz) to number average molecular weight (Mn) (Mz/Mn) of greater than 20, and a ratio of Mz to weight average molecular weight (Mw) (Mz/Mw) of greater than 3.0, functionalized polyethylene, and a free radical initiator. In one embodiment, the functionalized polyethylene includes functionalized polyethylene wax. In other embodiments, the functionalized polyethylene includes maleated polyethylene wax and the mixture includes at least 2% by weight of the maleated polyethylene wax. In another embodiment, the functionalized polyethylene includes maleated polyethylene wax and the mixture comprises at least 4% by weight of the maleated polyethylene wax. In some embodiments, the hot melt adhesive composition exhibits a fiber tearing bond at −29° C. and at +60° C. In other embodiments, the mixture further includes a polyfunctional acid.

In other aspects, the invention features a hot melt adhesive composition that includes a copolymer that includes the reaction product of a functionalized polyethylene, a propylene-alpha-olefin polymer comprising at least 50 mole % propylene, and a free radical initiator, the hot melt adhesive composition exhibiting a ratio of z average molecular weight (Mz) to number average molecular weight (Mn) (Mz/Mn) of greater than 18, and a ratio of Mz to weight average molecular weight (Mw) (Mz/Mw) of from 2.3 to no greater than 6. In one embodiment, the Mz/Mn is at least 27 and the Mz/Mw is from 2.5 to no greater than 6. In other embodiments, the adhesive composition exhibits at least 50% fiber tear at −29° C. and at +60° C. In some embodiments, the functionalized polyethylene includes functionalized polyethylene wax. In another embodiment, the composition further includes filler.

The adhesive composition exhibits good thermal stability and good fiber tearing properties over a wide range of temperatures.

Other features and advantages will be apparent from the following description of the preferred embodiments and from the claims.

GLOSSARY

In reference to the invention, these terms have the meanings set forth below:

The term "wax" means a polymer having crystallinity and a weight average molecular weight (Mw) less than 10,000 g/mole.

For ease of reference, when a polymer is referred to as including or comprising an olefin, the term "olefin" refers to the polymerized form of the olefin in the polymer.

DETAILED DESCRIPTION

The hot melt adhesive composition includes the reaction product of a functionalized polyethylene, a propylene-alpha-olefin polymer, a free radical initiator, and optionally a polyfunctional acid. The hot melt adhesive composition exhibits a viscosity of no greater than 2,000 centipoise (cps), no greater than 1,500 cps, no greater than 1,200 cps, no greater than 1,000 cps, no greater than 900 cps, or even from about 400 cps to about 2,000 cps at 177° C. The hot melt adhesive composition also forms a fiber tearing bond at −29° C. and at +60° C., and preferably exhibits at least about 50% fiber tear at −29° C. and at +60° C., at least about 80% fiber tear at −29° C. and at +60° C., at least about 90% fiber tear at −29° C. and at +60° C., or even at least 100% fiber tear at −29° C. and at +60° C. The hot melt adhesive composition preferably exhibits a set time of no greater than 15 seconds, no greater than 10 seconds, no greater than 7 seconds, or even no greater than 5 seconds. The hot melt adhesive composition has a z average molecular weight (Mz) of no greater than 100,000 g/mole, no greater than about 90,000 g/mole, no greater than about 80,000 g/mole, no greater than about 70,000 g/mole, no greater than about 60,000 g/mole, at least 20,000 g/mole, or even at least about 25,000 g/mole.

The hot melt adhesive composition preferably exhibits a weight average molecular weight (Mw) of no greater than about 50,000 g/mole, no greater than about 40,000 g/mole, no greater than about 35,000 g/mole, no greater than about 30,000 g/mole, or even no greater than about 25,000 g/mole, a number average molecular weight (Mn) of no greater than 5,000 g/mole, no greater than about 4,000 g/mole, no greater than about 3,500 a/mole, no greater than about 3,000 g/mole, or even no greater than 2,500 g/mole, an Mz/Mn of at least 15, at least 18, at least 20, at least 25, at least 27, or even at least 30, a Mz/Mw of at least 2.2, at least 2.5, at least 2.6, no greater than 6, no greater than 5.5, no greater than 5, or even no greater than 4.5, and a Mw/Mn of at least 6, at least 7.5, at least 9, or even at least 10.

The hot melt adhesive composition preferably is homogeneous and is thermally stable over an extended period of time. Thermal stability of a hot melt adhesive composition can be determined using a variety of methods including assessing the clarity, homogeneity, and the Gardner color of the composition. Preferably the hot melt adhesive composition is homogeneous after storage at elevated temperatures for 48 hours, 72 hours, or even 96 hours, and is visibly clear and free from phase separation, charring, and gelling after storage for 48 hours, 72 hours, or even 96 hours at 177° C.

The hot melt preferably exhibits an initial Gardner color of no greater than 3, no greater than 2, or even no greater than 1, and a Gardner color of no greater than 6, no greater than 5, or even no greater than 4 after aging for 48 hours, 72 hours, or even 96 hours, at 177° C.

The hot melt adhesive composition preferably is nontacky at room temperature, but can be formulated to be tacky at room temperature.

The hot melt adhesive composition preferably has a specific gravity of less than 0.930, no greater than 0.890, no greater than 0.885, no greater than 0.880, or even no greater than 0.875, a glass transition temperature (Tg) of less than −10° C., less than −20° C., or even less than −30° C., and a melt temperature (Tm) of at least about 105° C., at least 110° C., or even at least 115° C.

Reaction Product

The hot melt adhesive composition includes at least 50% by weight, at least about 55% by weight, at least about 60% by weight, at least about 70% by weight, at least about 75% by weight, at least about 80% by weight, at least about 85% by weight, at least about 90% by weight, from about 75% by weight to about 100% by weight, from about 75% by weight to about 95% by weight, or even from about 80% by weight to about 90% by weight of the reaction product of a functionalized polyethylene, a propylene-alpha-olefin polymer, a free radical initiator, and optionally a polyfunctional acid.

The reaction product preferably exhibits a single thermal melt transition temperature when tested using differential scanning calorimetry. The reaction product preferably exhibits a thermal melt transition at from about 100° C. to about 130° C., or even from about 110° C. to about 116° C.

The reaction product preferably is clear, exhibits an initial Gardner color of no greater than 3, no greater than 2, or even no greater than 1, and after aging for 48 hours at 177° C., preferably exhibits a Gardner color of no greater than 5, no greater than 4, or even no greater than 3.

The reaction product has a z average molecular weight (Mz) of no greater than 100,000 g/mole, no greater than about 90,000 g/mole, no greater than about 80,000 g/mole, no greater than about 70,000 g/mole, no greater than about 60,000 g/mole, at least 20,000 g/mole, or even at least about 25,000 g/mole.

The reaction product preferably exhibits a weight average molecular weight (Mw) of no greater than about 50,000 g/mole, no greater than about 40,000 g/mole, no greater than about 35,000 g/mole, no greater than about 30,000 g/mole, or even no greater than about 25,000 g/mole, a number average molecular weight (Mn) of no greater than 5,000 g/mole, no greater than about 4,000 g/mole, no greater than about 3,500 g/mole, no greater than about 3,000 g/mole, or even no greater than 2,500 g/mole, an Mz/Mn of at least 15, at least 18, at least 20, at least 25, at least 27, or even at least 30, a Mz/Mw of at least 2.2, at least 2.5, at least 2.6, no greater than 6, no greater than 5.5, no greater than 5, or even no greater than 4.5, and a Mw/Mn of at least 6, at least 7.5, at least 9, or even at least 10.

Without being bound by theory, the present inventors surmise that the reaction product is a copolymer of the functionalized polyethylene and the propylene-alpha-olefin polymer.

Functionalized Polyethylene

Useful functionalized polyethylenes include at least one polar functional group. Examples of useful functional groups include alcohol, ketone, aldehyde, acid, anhydride, ester, amine, amide, thiol, and combinations thereof. Useful functionalized polyethylenes include polyethylene polymers, polyethylene waxes, and combinations thereof. Useful functionalized polyethylenes include maleated (i.e., maleic acid and maleic anhydride modified) polyethylene, oxidized polyethylene, and combinations thereof. In some embodiments, a functionalized polyethylene wax is preferred.

Maleated polyethylenes preferably include at least 0.8 mole %, at least 1.6 mole %, or even from about 0.8 mole % to about 3.2 mole % functional groups. Useful functionalized polyethylenes have an acid number of from about 2 to about 40, from about 2 to about 10, or even from about 3 to about 8.

Useful functionalized polyethylenes have a crystallinity of at least 10%, at least 30% or even at least 50% and a heat of fusion of at least 70 J/g, at least 85 J/g or even at least 94 J/g and can be linear or branched.

Useful functionalized polyethylene waxes have a melting point of at least 100° C., and a viscosity of from about 20 cps to about 1,500 cps, or even from about 200 cps to about 800 cps. Useful linear functionalized polyethylene waxes have a weight average molecular weight (Mw) of no greater than about 10,000 g/mole, at least about 1,000 g/mole, from about 500 g/mole to about 20,000 g/mole, or even from about 4,000 g/mole to about 9,500 g/mole.

One example of a useful maleated wax is A-C-X 1783 maleated polyethylene wax, which is commercially available under the trade designation A-C 577P from Honeywell International Inc. (Morristown, N.J.).

The reaction product is formed from at least 2% by weight, at least about 3% by weight, at least about 4% by weight, at least about 5% by weight, at least about 7% by weight, from 2% by weight to about 20% by weight, from about 3% by weight to about 20% by weight, from about 5% by weight to about 15% by weight, or even from about 5% by weight to about 10% by weight of the functionalized polyethylene based on the weight of the reaction product.

Propylene-Alpha-Olefin Polymer

The propylene-alpha-olefin polymer exhibits a viscosity of at least about 1,000 cps, at least about 3,000 cps, at least about 5,000 cps, no greater than about 20,000 cps, no greater than about 15,000 cps, or even no greater than about 10,000 cps at 190° C., a Mz/Mn of at least 40, greater than 45, greater than 50, or even greater than 55, and a Mz/Mw of at least 2.5, at least 2.8, at least 3.0, or even at least 3.2. The propylene-alpha-olefin polymer preferably exhibits a glass transition temperature (Tg) of less than −10° C., less than −20° C., or even less than −30° C.

Useful propylene-alpha-olefin polymers also exhibit a number average molecular weight (Mn) of at least about 1,500 g/mole, no greater than about 7,500 g/mole, or even no greater than about 5,000 g/mole, a weight average molecular weight (Mw) of no greater than about 65,000 g/mole, no greater than about 60,000 g/mole, at least about 20,000 g/mole, or even at least about 30,000 g/mole, and a z average molecular weight (Mz) of no greater than about 250,000 g/mole, no greater than about 240,000 g/mole, no greater than about 210,000 g/mole, no greater than about 200,000 g/mole, or even no greater than about 175,000 g/mole.

Useful propylene-alpha-olefin polymers exhibit a crystallinity of at least 5%, at least about 10%, no greater than about 30%, or even no greater than about 20%, and a heat of fusion of no greater than 60 J/g, no greater than 30 J/g, or even no greater than 20 J/g.

Useful propylene-alpha-olefin polymers include homopolymers, copolymers (i.e., copolymers, terpolymers, and higher order polymers), and combinations thereof. Useful propylene-alpha-olefin polymers are derived from propylene and at least one alpha-olefin comonomer having two carbon atoms, or even at least four carbon atoms, including, e.g., ethylene, butene, pentene, hexene, heptene, octene, nonene, decene, dodecene, and combinations thereof.

Useful propylene-alpha-olefin polymers include at least 50 mole %, at least about 60 mole %, no greater than about 80 mole %, or even from about 50 mole % to about 70 mole % propylene, and at least 2 mole %, at least 5 mole %, at least about 10 mole %, at least about 20 mole %, at least about 25 mole %, at least about 30 mole %, no greater than about 50 mole %, or even from about 20 mole % to about 50 mole % of at least one alpha-olefin comonomer.

The propylene-alpha-olefin polymer preferably is free of functional groups but optionally includes functional groups (e.g., maleic anhydride modified propylene-alpha-olefin polymer). The propylene-alpha-olefin polymer also preferably has an acid number of zero.

Useful propylene-alpha-olefin polymers are commercially available under a variety of trade designations including, e.g., the REXTAC 2000 series of trade designations from Rextac LLC (Odessa, Tex.) including REXTAC RT 2765 propylene butene copolymer, REXTAC RT 2788 propylene-butene copolymer, REXTAC RT 2780 propylene-butene copolymer, REXTAC RT 2215 propylene-ethylene copolymer, REXTAC RT 2385 propylene-ethylene copolymer, REXTAC RT 2535 propylene-ethylene copolymer, and REXTAC RT 2585 propylene-ethylene copolymer, the EASTOFLEX series of trade designations from Eastman Chemical Co. (Kingsport, Tenn.) including EASTOFLEX E1060 propylene-ethylene copolymer, and the VESTOPLAST series of trade designations from Evonik Industries (Marl, Germany) including VESTOPLAST EP NC 702 propylene-butene-ethylene terpolymer and VESTOPLAST 608 propylene-butene-ethylene terpolymer, and combinations thereof.

The reaction product is formed from at least about 70% by weight, at least about 75% by weight, at least about 80% by weight, at least about 85% by weight, at least about 90% by weight, from about 75% by weight to about 95% by weight, or even from about 80% by weight to about 90% by weight propylene-alpha-olefin polymer based on the weight of the reaction product.

Free Radical Initiator

Useful free-radical initiators include, e.g., peroxide type compounds, azo-type compounds, and mixtures thereof. Examples of suitable peroxide compounds include diacyl peroxides, peroxy esters, peroxy ketals, di-alkyl peroxides, and hydroperoxides, specifically hydrogen peroxide, benzoyl peroxide, deconoyl peroxide, lauroyl peroxide, succinic acid peroxide, cumere hydroperoxide, t-butylhydroperoxide, t-butyl peroxy acetate, 2,2 di(t-butyl peroxy) butane di-allyl peroxide), 2,5-dimethyl-2,5-di(tertiarybutyl peroxy)hexane, cumyl peroxide, and combinations thereof. Suitable 2,5-dimethyl-2,5-di(tertiarybutyl peroxy)hexanes are commercially available under the LUPERSOL 101 trade designation from United Initiator Incorporated (Elyria, Ohio).

Examples of suitable azo-type compounds include azobisisobutyronitrile (AIBN), 2,2'-azobis(N,N'-dimethyleneisobutyramide)dihydrochloride (one example of which is commercially available under the VA-044 trade designation from Wako Chemical Co.), 2,2'-azobis(2,4-dimethyl valeronitrile) (one example of which is commercially available under the V-65 trade designation from Wako Chemical Co.), VAZO 64 2,2-azobis(isobutyronitrile) and VAZO 67 2,2'-azobis(2-methylbutyronitrile) both of which are commercially available from du Pont de Nemours and Company (Wilmington, Del.), 1,1'-azobis(1-cyclohexane carbonitrile), acid-functional azo-type initiators e.g., 4,4'-azobis(4-cyanopentanoic acid), and combinations thereof.

Optional Polyfunctional Acid

The reaction mixture optionally includes a polyfunctional acid. Examples of suitable polyfunctional acids include dicarboxylic acids and tricarboxylic acids including, e.g., aromatic dicarboxylic acids (e.g. methyl-hexahydrophthalic anhydride, methyl-tetrahydrophthalic anhydride, and hexahydrophthalic anhydride), aliphatic dicarboxylic acids (e.g. maleic acid, succinic acid, succinic anhydride, glutaric acid, adipic acid, pirnelic acid, suberic acid, azelaic acid, sebacic acid, chlorendic acid, 1,2,4-butane-tricarboxylic acid, decanedicarboxylic acid, octadecanedicarboxylic acid, tetrahydrophthalic acid, methyl-tetrahydrophthalic acid, hexahydrophthalic acid, methyl-hexahydrophthalic acid, dimeric acid, and fumaric acid), alicyclic dicarboxylic acids (e.g. 1,3-cyclohexanedicarboxylic acid, and 1,4-cyclohexanedicarboxylic acid), and combinations thereof. The corresponding acid anhydrides, esters, and acid chlorides, and combinations thereof, of these acids is included in the term "dicarboxylic acid".

The reaction product is formed from 0% by weight to no greater than about 7% by weight, at least about 1% by weight, at least about 3% by weight, no greater than about 5% by weight, from about 1% by weight to about 7% by weight, or even from about 1% by weight to about 5% by weight polyfunctional acid based on the weight of the reaction product.

Process

The reaction product is prepared by treating a mixture of the propylene-alpha-olefin polymer, functionalized polyethylene, and optional polyfunctional acid with the free radical initiator at an elevated temperature. The treatment alters the weight average molecular weight and the z average molecular weight of the propylene-alpha-olefin polymer. The treatment causes a decrease in the melt viscosity of the propylene-alpha-olefin polymer.

The reaction conditions preferably include from about 0.005% by weight to about 10% by weight free radical initiator, or even from about 0.01% by weight to about 5% by weight free radical initiator based on the weight of the polymer, functionalized polyethylene, and optional polyfunctional acid being treated, and a temperature of from about 150° C. to about 250° C., or even from about 175° C. to about 225° C. The reaction time may vary from less than a minute to several hours depending on the temperature used and the half life of the free radical initiator being used.

The reaction product can be prepared using any suitable method including, e.g., continuous processes and batch processes. Suitable continuous processes include, processes that use extruders (e.g., single screw, twin screw, disk screw, reciprocating single screw, and pin barrel single screw) and processes that use tandem extrusion techniques. Suitable batch processes include, e.g., processes that utilize reaction vessels. Suitable reaction vessels include those made from glass or metal. For example, the reactions may be conducted in glass flasks, glass lined reactors, steel autoclaves, extruders, Brabender plastographs, and Banbury mixers. The reactions may be conducted in the presence of air or under inert gases such as nitrogen. Although not required, it is also possible to carry out the treatment in the presence of an inert solvent such as benzene.

Optional Wax

The hot melt adhesive composition optionally includes a wax. Useful classes of waxes include, e.g., functionalized waxes, non-functionalized waxes, and mixtures thereof. Useful functionalized waxes include, e.g., functionalized polyethylene wax (e.g., maleated polyethylene wax and oxidized polyethylene wax), functionalized polypropylene wax (e.g., maleated polypropylene wax and oxidized polypropylene wax), polar waxes, functionalized stearamide waxes (e.g., hydroxystearamide, N-(2-hydroxy ethyl)-12-hydroxystearamide, N,N'-ethylene bis 12-hydroxystearamide, and 12-hydroxy stearic acid N,N' ethylene-bis stearamide), and combinations thereof. Useful non-functionalized waxes include, e.g., Fischer Tropsch waxes, polyolefin waxes (e.g., polypropylene waxes and polyethylene waxes), stearamide waxes, benzoate ester waxes, animal waxes, vegetable waxes, paraffin waxes, microcrystalline waxes, metallocene waxes, glycerin monostearate, sorbitan monostearate, and combinations thereof.

The optional wax preferably has a melting point of at least about 100° C., a viscosity of from about 20 cps to about 500 cps at 140° C., a density of from about 0.90 g/cm$^3$ to about 0.95 g/cm³, and a heat of fusion of at least about 70 J/g, at least about 85 J/g or even at least about 94 J/g. The optional wax can be linear or branched. Useful waxes also include waxes with a softening point greater than about 140° C. and a viscosity of from about 20 cps to about 1,000 cps at 190° C.

Useful commercially available functionalized waxes include, e.g., A-C 597P maleated polypropylene wax and A-C 1325 maleated polypropylene wax, both of which are available from Honeywell International Inc.

Useful commercially available non-functionalized waxes include EPOLENE N-21 linear polyethylene wax from Westlake Chemical Corporation, AC-8 and AC-9 linear polyethylene waxes, both of which are commercially available from Honeywell International (Morristown, N.J.), and PX105 Fischer-Tropsch wax from Baker Hughes Incorporated (Houston, Tex.).

The optional wax, when present in the hot melt adhesive composition, is preferably present in an amount of at least 0.2% by weight, at least 2% by weight, at least about 5% by weight, at least about 10% by weight, no greater than about 30% by weight, no greater than about 25% by weight, from about 5% by weight to about 15% by weight, or even from about 5% by weight to about 10% by weight.

Additives

The hot melt adhesive composition optionally includes additional components including, e.g., additional waxes, stabilizers, oil (e.g., aliphatic napthenic oil, white oil, and combinations thereof), antioxidants, additional polymers, tackifying agents, photoinitiators, plasticizers, adhesion promoters, ultraviolet light stabilizers, rheology modifiers, biocides, corrosion inhibitors, dehydrators, colorants (e.g., pigments and dyes), fillers, surfactants, flame retardants, nucleating agents, and combinations thereof.

Useful antioxidants include, e.g., pentaerythritol tetrakis[3 (3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2, 4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants and IRGAFOS 168 phosphite antioxidant, all of which are available from BASF Corporation (Florham Park, N.J.), and ETHYL 702 4,4'-methylene bis(2,6-di-tert-butylphenol). When present, the adhesive composition preferably includes from about 0.1% by weight to about 2% by weight antioxidant.

Useful additional polymers include, e.g., homopolymers and copolymers, thermoplastic polymers including, e.g., polyolefins (e.g., polyethylene, polypropylene, metallocene-catalyzed polyolefins (e.g., propylene-ethylene copolymers), and combinations thereof), elastomers including, e.g., elastomeric block copolymers (e.g., styrene-butadiene-styrene, styrene-isoprene-styrene, styrene-ethylene-butene-styrene, styrene-ethylene-propylene-styrene, metallocene-based elastomeric block copolymers, and combinations thereof), and functionalized versions thereof, and combinations thereof. Examples of suitable polymers include, e.g., EPOLENE C-18 maleated branched polyethylene, EPOLENE C-15 branched polyethylene, and EPOLENE C-10 branched polyethylene, which are available from Westlake Chemical Corporation (Houston, Tex.), and VERSIFY 4200 metallocene propylene-ethylene copolymer (Dow Chemical, Midland, Mich.).

The optional polymer, when present in the hot melt adhesive composition, is preferably present in an amount no greater than about 5% by weight, no greater than about 3% by weight, or even from about 1% by weight to about 4% by weight.

Useful tackifying agents have Ring and Ball softening point of less than about 140° C., less than about 130° C., or even less than about 100° C. Suitable classes of tackifying agents include, e.g., aromatic, aliphatic and cycloaliphatic hydrocarbon resins, mixed aromatic and aliphatic modified hydrocarbon resins, aromatic modified aliphatic hydrocarbon resins, and hydrogenated versions thereof; terpenes, modified terpenes and hydrogenated versions thereof; natural rosins, modified rosins, rosin esters, and hydrogenated versions thereof; low molecular weight polylactic acid; and combinations thereof. Examples of useful natural and modified rosins include gum rosin, wood rosin, tall oil rosin, distilled rosin, hydrogenated rosin, dimerized rosin and polymerized rosin. Examples of useful rosin esters include e.g., glycerol esters of pale wood rosin, glycerol esters of hydrogenated rosin, glycerol esters of polymerized rosin, pentaerythritol esters of natural and modified rosins including pentaerythritol esters of pale wood rosin, pentaerythritol esters of hydrogenated rosin, pentaerythritol esters of tall oil rosin, and phenolic-modified pentaerythritol esters of rosin. Examples of useful polyterpene resins include polyterpene resins having a softening point, as determined by ASTM method E28-58T, of from about 10° C. to about 140° C., hydrogenated polyterpene resins, and copolymers and terpolymers of natural terpenes (e.g. styrene-terpene, alpha-methyl styrene-terpene and vinyl toluene-terpene). Examples of useful aliphatic and cycloaliphatic petroleum hydrocarbon resins include aliphatic and cycloaliphatic petroleum hydrocarbon resins having Ring and Ball softening points of from about 10° C. to 140° C. (e.g., branched and unbranched C5 resins, C9 resins, and C10 resins) and the hydrogenated derivatives thereof.

Useful tackifying agents are commercially available under a variety of trade designations including, e.g., the ESCOREZ series of trade designations from Exxon Mobil Chemical Company (Houston, Tex.) including ESCOREZ 5400, ESCOREZ 5415, ESCOREZ 5600, ESCOREZ 5615, and ESCOREZ 5690, the EASTOTAC series of trade designations from Eastman Chemical (Kingsport, Tenn.) including EASTOTAC H-100R, EASTOTAC H-100L, and EASTOTAC H130W, the WINGTACK series of trade designations from Cray Valley HSC (Exton, Pa.) including WINGTACK 86, WINGTACK EXTRA and WINGTACK 95 and the PICCOTAC series of trade designations from Eastman Chemical Company (Kingsport, Tenn.) including, e.g., PICCOTAC 8095.

When a tackifying agent is present in the adhesive composition, the adhesive composition preferably includes no greater than about 50% by weight, no greater than about 40% by weight, no greater than about 30% by weight, no greater than about 20% by weight, no greater than about 10% by weight, no greater than about 5% by weight, at least about 1% by weight, at least about 15% by weight, at least about 20% by weight, from about 1% by weight to about 30% by weight, from about 15% by weight to about 30% by weight, or even from about 1% by weight to about 10% by weight tackifying agent.

Useful photoinitiators are capable of promoting free radical polymerization, crosslinking, or both, of the ethylenically unsaturated moiety on exposure to radiation of a suitable wavelength and intensity. The photoinitiator can be used alone or in combination with a suitable donor compound or a suitable coinitiator. The photoinitiator and the amount thereof are preferably selected to achieve a uniform reaction conversion, as a function of the thickness of the composition being cured, as well as a sufficiently high degree of total conversion so as to achieve the desired initial handling strength (i.e., green strength).

Useful photoinitiators include, e.g., "alpha cleavage type" photoinitiators including, e.g., benzyl dimethyl ketal, benzoin ethers, hydroxy alkyl phenyl ketones, benzoyl cyclohexanol, dialkoxy acetophenones, 1-hydroxycyclohexyl phenyl ketone, trimethylbenzoyl phosphine oxides, methyl thio phenyl morpholino ketones and morpholino phenyl amino ketones; hydrogen abstracting photoinitiators; and combinations thereof.

Useful commercially available photoinitiators are available under a variety of trade designations including, e.g., IRGACURE 369 morpholino phenyl amino ketone, IRGACURE 819 bis(2,4,6-trimethylbenzoyl)-phenylphosphine oxide, IRGACURE CGI 403 bis(2,6-dimethoxybenzoyl)-(2,4,4-trimethylpentyl)phosphine oxide, IRGACURE 651 benzyl dimethyl ketal, and IRGACURE 184 benzoyl cyclohexanol all of which are available from BASF Corporation (Florham Park, N.J.), DAROCUR 1173 hydroxy alkyl phenyl ketones, DAROCUR 4265 50:50 blend of 2-hydroxy-2-methyl-1-phenylpropan-1-one and 2,4,6-trimethylbenzoyl-diphenylphosphine oxide, and CGI1700 25:75 blend of bis (2,6-dimethoxybenzoyl)-2,4,4-trimethylpentylphosphine and 2-hydroxy-2-methyl-1-phenylpropan-1-one, which are available from Ciba-Geigy Corp. (Ardsley, N.Y.).

When present, the photoinitiator is preferably present in the composition in an amount sufficient to provide the desired rate of photopolymerization. The amount will depend, in part, on the light source, the thickness of the layer to be exposed to radiant energy, and the extinction coefficient of the photoinitiator at the wavelength. Typically, the photoinitiator component will be present in an amount of from about 0.01% by weight to about 5% by weight, more preferably from about 0.1% by weight to about 1% by weight.

Uses

The hot melt adhesive composition is useful for bonding a variety of substrates including, e.g., cardboard, coated cardboard, paperboard, fiber board, virgin and recycled kraft, high and low density kraft, chipboard, treated and coated kraft and chipboard, and corrugated versions of the same, clay coated chipboard carton stock, composites, leather, polymer film (e.g., polyolefin, polyester, metalized polymer film, multilayer film, and combinations thereof), substrates made from fibers (e.g., virgin fibers, recycled fibers, and combinations thereof), and combinations thereof. Useful composites include, e.g., chipboard laminated to metal foil (e.g., aluminum foil), which optionally can be laminated to at least one layer of polymer film, chipboard bonded to film, Kraft bonded to film (e.g., polyethylene film), and combinations thereof.

The hot melt adhesive composition is useful for forming adhesive bonds in a variety of articles including, e.g., bags, boxes, cartons, cases, trays, multi-wall bags, articles that include attachments (e.g., straws attached to drink boxes), ream wrap, cigarettes (e.g., plug wrap), filters (e.g., filter pleating and filter frames), bookbinding, and footwear manufacture, and combinations thereof.

The hot melt adhesive composition is also useful in bonding a first substrate to a second substrate e.g. as in the lamination of porous substrates and polymer film such as those used in the manufacture of disposable articles including, e.g., medical drapes, medical gowns, sheets, feminine hygiene articles, diapers, adult incontinence articles, absorbent pads (e.g., for animals (e.g., pet pads) and humans (e.g., bodies and corpses)), and on a variety of substrates including, e.g., porous substrates (e.g., nonwoven webs and perforated films), film (e.g., polymer films (e.g., polyethylene, polypropylene, polyvinylidene chloride, ethylene vinyl acetate, and polyester films), and combinations thereof.

The hot melt adhesive composition can be applied to a substrate in any useful form including, e.g., a coating (e.g., a continuous or discontinuous coating), a film (e.g., a continuous or discontinuous film), in a pattern (a spray pattern), randomly, and combinations thereof, using any suitable application method including, e.g., slot coating, spray coating (e.g., spiral spray, random spraying, and random fiberization (e.g., melt blowing)), foaming, extrusion (e.g., applying a bead, fine line extrusion, single screw extrusion, and twin screw extrusion), wheel application, noncontact coating, contacting coating, gravure, engraved roller, roll coating, transfer coating, screen printing, flexographic, and combinations thereof.

In some embodiments, the hot melt adhesive composition is radiation curable. The radiation curable hot melt adhesive composition can be cured using radiation from a variety of sources including, e.g., Ultraviolet light (i.e., UV), electron beam, and combinations thereof. The radiation curable hot melt adhesive composition can be exposed to radiation at any suitable point including, e.g., simultaneously with coating the composition, after coating the composition (e.g., after coating the composition on a first substrate and prior to contacting the composition with a second substrate), after contacting the coated composition with a substrate, and combinations thereof.

The invention will now be described by way of the following examples. All parts, ratios, percents and amounts stated in the Examples are by weight unless otherwise specified.

EXAMPLES

Test Procedures

Test procedures used in the examples include the following. All ratios and percentages are by weight unless otherwise indicated.

Thermal Stability

Thermal Conditioning Procedure

A 200 gram (g) sample of hot melt composition is placed in a 400 milliliter (ml) PYREX glass beaker and held at 350° F. (177° C.) for periods of 24 hours, 48 hours, 72 hours, and 96 hours.

Gardner Color

A sample is conditioned according to the thermal conditioning procedure and then tested (in the molten state) to determine Gardner color by comparing the color of the sample against the Gardner Color Standards as set forth in ASTM D-1544. The comparison is made using a Gardner Delta Comparator equipped with an Illuminator available from Pacific Scientific (Bethesda, Md.).

Clarity

A sample is conditioned according to the thermal conditioning procedure and then observed for clarity with the naked eye. The visual observations are recorded. The presence of particles, polymer "seeds," settling, and phase separation (e.g., visible layers) are indicative of a lack of homogeneity.

Differential Scanning Calorimetry (DSC) Test Method

Glass transition temperature (Tg), melt temperature (Tm), heat of fusion ($\Delta$f) and crystallization are determined using differential scanning calorimetry according to ASTM E-793-01 entitled, "Standard Test Method for Heats of Fusion and Crystallization by Differential Scanning calorimetry," using the following conditions: heating the sample to 160° C., holding for 5 minutes at 160° C., quench cooling to −60° C., and then heating from −60° C. to 160° C. at a rate of 10° C. per minute. The results are reported in degrees Celsius, Joules per gram and % for Tg and Tm, ΔH and crystallinity, respectively.

Viscosity Test Method

ASTM D-3236 entitled, "Standard Test Method for Apparent Viscosity of Hot Melt Adhesives and Coating Materials," (1988) using a Brookfield Thermoset viscometer Model RVDV 2+ and a number 27 spindle at 20 rotations per minute. The results are reported in centipoise ("cps").

Method for Determining Molecular Weight

Molecular weights (Mn, Mw, and Mz) are determined using a Polymer Labs PL-GPC 220 High Temperature Size Exclusion Chromatograph (HT-SEC) operating at 160° C. with 1,2,4-trichlorobenzene (TCB) as the mobile phase. The system contains three PL-gel mixed B columns in series and is equipped with a Refractive Index (RI) detector. The SEC operates at a flow rate of 1.0 ml/min with an injection volume of 100 μL. All HT-SEC samples are prepared with a concentration of 4.0 mg/ml. Molecular weights are calculated from the Mark-Houwink relation using known polystyrene standards. For polystyrene the Mark-Houwink parameters are K=0.000121 and α=0.707; for polypropylene the Mark-Houwink parameters are, K=0.000190 and α=0.725. The results are reported in grams per mole (g/mole).

Percent Fiber Tear Test Method

The percentage fiber tear is the percentage of fiber that covers the area of the adhesive after two substrates, which have been previously bonded together through the adhesive, are separated by force. The percentage of fiber tear is determined as follows. A bead of adhesive composition measuring 15.24 cm (6 inch)×0.24 cm (3/32 inch) is applied to a first substrate of Inland high performance 57 pound 100% virgin liner board, using a Waldorf bond simulator at the specified application temperature. Two seconds after the bead of adhesive is applied to the first substrate, the bead of adhesive is contacted with a second substrate of Inland high performance 57 pound 100% virgin liner board, which is pressed against the adhesive and the first substrate with a pressure of 0.21 Mpa (30 pounds per square inch (psi)) for a period of 2 seconds. The resulting construction is then conditioned at the specified test temperature for at least 24 hours. The substrates of the construction are then separated from one another by pulling the two substrates apart from one another by hand. The surface of the adhesive composition is observed and the percent of the surface area of the adhesive composition that is covered by fibers is determined and recorded. A minimum of five samples are prepared and tested for each sample composition.

Set Time Test Method

A bead of adhesive composition measuring 15.24 cm (6 inch)×0.24 cm (3/32 inch) is applied to a first substrate of Inland high performance 57 pound 100% virgin liner board, using a Waldorf bond simulator at the specified application temperature. Two seconds after the bead of adhesive is applied to the first substrate, the bead of adhesive is contacted with a second substrate of Inland high performance 57 pound 100% virgin liner board, which is pressed against the adhesive and the first substrate with a pressure of 0.21 Mpa (30 pounds per square inch (psi)) for a period of 2 seconds. A timer is started as the bead is applied to the first substrate. When the timer is at 5 seconds, the now formed bond is pulled apart. If the bond results in less than 100% fiber failure, another bond is made and pulled after 5.5 seconds. In this manner, one continues to increase the time, prior to pulling the bond, in 0.5 second increments until the set time is arrived upon. The set time is the shortest amount of time in which a pulled bond results in 100% fiber failure. Once a set time is achieved, the test is repeated one more time to confirm the result. If the bond gives 100% fiber failure at 5 seconds, the set time is recorded as no greater than 5 seconds.

Propylene-Alpha-Olefin Copolymers

Polymer 1: a 65% by weight propylene 35% by weight butene copolymer having a viscosity of 6500 cps at 190° C., a Mn of 2610, Mw of 39,100, Mz of 145,000, Mz/Mn of 55.6, and Mz/Mw of 3.7.

Polymer 2: a 65% by weight propylene 35% by weight butene copolymer having a viscosity of 8500 cps at 190° C., a Mn of 3420, Mw of 45,200, Mz of 154,000, Mz/Mn of 45.0, and Mz/Mw of 3.4.

Polymer 3: a 55% by weight propylene 45% by weight butene copolymer having a viscosity of 8500 cps at 190° C., Polymer 4: a 50% by weight propylene 50% by weight butene copolymer having a viscosity of 8500 cps at 190° C., Mn of 4390, Mw of 57,600, Mz of 232,000, a polydispersity index of 13.1, Mz/Mn of 52.8, and Mz/Mw of 4.0.

Polymer 5: a 65% by weight propylene 35% by weight copolymer having a viscosity of 8000 cps at 190° C., a Mn of 4880, Mw of 55,600, Mz of 233,000, Mz/Mn of 47.7, and Mz/Mw of 4.2.

Bases 1-8 and 11-12

Base hot melt compositions 1-8 and 11-12 were prepared by treating a propylene-alpha-olefin copolymer and, where indicated, a wax, with a 92% 2,5-dimethyl-2,5-di(tertbutylperoxy)hexane (United Initiator Incorporated, Elyria, Ohio) under vacuum pulling a pressure of about 29 inches of mercury (Hg) and at a temperature of from about 175° C. to about 190° C. for a period of about 45 minutes.

The type and amount of polymer, wax and peroxide were as specified in Table 1.

The Mz, Mw, Mn, Mz/Mw and Mz/Mn were determined for Bases 1, 2 and 12 and are set forth in Table 1.

Base 9

Base hot melt composition 9 was prepared by treating a 65% by weight propylene 35% by weight butene copolymer (i.e., Polymer 1) with 1.5% by weight LUPRESOL 101 organic peroxide (United Initiator Incorporated, Elyria, Ohio) in an extruder at a temperature of 400° F. (204.4° C.) for a residence time of 90 seconds.

TABLE 1

| Sample | Polymer No. | Polymer (% by weight) | A-C-X 1783 Wax[1] (% by weight) | EPOLENE N21 Wax[2] (% by weight) | A-C 597 Wax[3] | Peroxide (% by weight) | Mz | Mn | Mw | Mz/Mn | Mz/Mw |
|---|---|---|---|---|---|---|---|---|---|---|---|
| Base 1 | 1 | 85 | 15 | 0 | 0 | 1.7 | 47600 | 1620 | 17800 | 29.4 | 2.7 |
| Base 2 | 1 | 95 | 5 | 0 | 0 | 1.7 | 56200 | 1830 | 19900 | 30.7 | 2.8 |
| Base 3 | 1 | 95 | 0 | 5 | 0 | 1.7 | ND | ND | ND | ND | ND |
| Base 4 | 1 | 95 | 0 | 0 | 5 | 1.7 | ND | ND | ND | ND | ND |

TABLE 1-continued

| Sample | Polymer No. | Polymer (% by weight) | A-C-X 1783 Wax[1] (% by weight) | EPOLENE N21 Wax[2] (% by weight) | A-C 597 Wax[3] | Peroxide (% by weight) | Mz | Mn | Mw | Mz/Mn | Mz/Mw |
|---|---|---|---|---|---|---|---|---|---|---|---|
| Base 5 | 1 | 95 | 5 | 0 | 0 | 1.1 | ND | ND | ND | ND | ND |
| Base 6 | 2 | 95 | 5 | 0 | 0 | 1.7 | ND | ND | ND | ND | ND |
| Base 7 | 3 | 90 | 10 | 0 | 0 | 1.7 | ND | ND | ND | ND | ND |
| Base 8 | 4 | 85 | 15 | 0 | 0 | 1.7 | ND | ND | ND | ND | ND |
| Base 8a | 3 | 85 | 15 | 0 | 0 | 1.7 | ND | ND | ND | ND | ND |
| Base 9 | 1 | 100 | 0 | 0 | 0 | 1.5 | ND | ND | ND | ND | ND |
| Base 10 | 2 | 100 | 0 | 0 | 0 | 1.7 | ND | ND | ND | ND | ND |
| Base 11 | 5 | 85 | 15 | 0 | 0 | 1.7 | ND | ND | ND | ND | ND |
| Base 12 | 2 | 95 | 5 | 0 | 0 | 1.1 | 46300 | 2280 | 19300 | 20.3 | 2.5 |

[1] = A-C-X 1783 maleated linear low density polyethylene wax having an acid number of 4.5, a saponification value of 6.2, a viscosity at 140° C. of 60 centipoise, a penetration value of 0.5 dmm, a Mw of 8,650, a Mn of 1,700, an Mz of 18,000 and a Mw/Mn of 5.08.
[2] = EPOLENE N21 polyethylene wax
[3] = A-C 597 maleated polypropylene wax
ND = Not Determined Controls 1-4

The hot melt compositions of Controls 1-4 were prepared from Bases 3, 4 and 9-10, melt blended with 1.0% by weight IRGAFOS 168 antioxidant, 0.5% by weight IRGANOX 1010 antioxidant, and optionally additional components as indicated and in the amounts set forth in Table 2. The hot melt compositions of Controls 1-4 were tested according to the Viscosity, Fiber Tear, Set Time, Clarity and Gardner Color test methods and the results are set forth in Table 3.

Examples 1-18

Hot melt adhesive compositions of Examples 1-18 were prepared from Bases 1, 2, 5, 6, 7, 8, 8a, 10, 11 and 12, melt blended with 1.0% by weight IRGAFOS 168 antioxidant, 0.5% by weight IRGANOX 1010 antioxidant, and optionally additional components (e.g., wax and polymer) in the amounts (in % by weight) set forth in Table 2. The hot melt adhesive compositions of Examples 1-14 were tested according to the Viscosity, Fiber Tear, and Set Time test methods and the results are set forth in Table 3. The initial clarity and the clarity observed after 48 hours and 96 hours at 350° F. (177° C.) are also reported in Table 3.

TABLE 2

| Sample | Base No. | Base % by weight | Wax[4] | Wax[5] | Wax[6] | Wax[10] | Polymer | Tg (° C.) | Tm (° C.) | Acid No. |
|---|---|---|---|---|---|---|---|---|---|---|
| Example 1 | Base 2 | 90 | 7 | 1 | 0 | 0 | 2[7] | −24 | 116 | 1.0 |
| Example 2 | Base 1 | 100 | 0 | 0 | 0 | 0 | 0 | ND | ND | ND |
| Example 3 | Base 2 | 90 | 10 | 0 | 0 | 0 | 0 | −27 | 116 | 0.1 |
| Example 4 | Base 5 | 90 | 8.5 | 1.5 | 0 | 0 | 0 | ND | ND | ND |
| Example 5 | Base 5 | 82 | 7 | 2 | 0 | 0 | 9[8] | −22 | 117 | ND |
| Example 6 | Base 8 | 100 | 0 | 0 | 0 | 0 | 0 | ND | ND | ND |
| Example 7 | Base 8a | 100 | 0 | 0 | 0 | 0 | 0 | −24 | 110 | 0.3 |
| Example 8 | Base 11 | 100 | 0 | 0 | 15 | 0 | 0 | −27 | 110 | 0.3 |
| Example 9 | Base 2 | 90 | 7 | 0 | 0 | 0 | 3[9] | −21 | 113 | 0.5 |
| Example 10 | Base 5 | 90 | 8.5 | 1.5 | 0 | 0 | 0 | ND | ND | ND |
| Example 11 | Base 5 | 90 | 7 | 1.5 | 0 | 0 | 1.5[7] | ND | ND | ND |
| Example 12 | Base 5 | 90 | 7 | 1.5 | 0 | 0 | 1.5[9] | ND | ND | ND |
| Example 13 | Base 11 | 87 | 8.5 | 1 | 0 | 0 | 2[11] | ND | ND | ND |
| Example 14 | Base 11 | 87 | 8.5 | 0 | 0 | 1 | 2[11] | ND | ND | ND |
| Control 1 | Base 10 | 85 | 0 | 0 | 15 | 0 | 0 | ND | ND | ND |
| Example 15 | Base 6 | 100 | 0 | 0 | 0 | 0 | 0 | −24 | 116 | 0.1 |
| Example 16 | Base 7 | 100 | 0 | 0 | 0 | 0 | 0 | −25 | 113 | 0.1 |
| Control 2 | Base 9 | 76.5 | 20 | 2 | 0 | 0 | 0 | ND | ND | ND |
| Example 17 | Base 8 | 100 | 0 | 0 | 0 | 0 | 0 | ND | ND | ND |
| Example 18 | Base 10 | 85 | 0 | 0 | 15 | 0 | 0 | −25 | 153 | 1.3 |
|  |  |  |  |  |  |  |  | −17 | 111 |  |

TABLE 2-continued

| Sample | Base No. | Base % by weight | Wax[4] | Wax[5] | Wax[6] | Wax[10] | Polymer | Tg (° C.) | Tm (° C.) | Acid No. |
|---|---|---|---|---|---|---|---|---|---|---|
| Control 3 | Base 3 | 90 | 0 | 0 | 10 | 0 | 0 | −25 | 114 | 0.8 |
| Control 4 | Base 4 | 90 | 10 | 0 | 0 | 0 | 0 | ND | ND | ND |

FT = fiber tear
[4]= EPOLENE N21 polyethylene wax (Westlake Chemical Corp., Houston, Texas)
[5]= A-C 597 maleated polypropylene wax
[6]= A-C 1783 maleated polyethylene wax
[7]= EPOLENE C-10 polyethylene (Westlake Chemical Corp., Houston, Texas)
[8]= REXTAC RT 2115 propylene homopolymer (Rextac LLC, Odessa, Texas)
[9]= EPOLENE C-18 maleated branched polyethylene (Westlake Chemical Corp., Houston, Texas)
[10]= A-C 1325 maleated polypropylene wax (Honeywell International Inc., Morristown, New Jersey).
[11]= VERSIFY 4200 metallocene propylene-ethylene copolymer (Dow Chemical, Midland, Michigan)

TABLE 3

| Sample | % FT −29° C. | % FT 22° C. | % FT +60° C. | Viscosity (cP) | Gardner Color (initial) | Gardner Color (48 Hours) | Gardner Color (96 Hours) | Set Time (seconds) | Clarity (Initial) | Clarity (96 hours) |
|---|---|---|---|---|---|---|---|---|---|---|
| Example 1 | 76 | 100 | 80 | 750 | 2-3 | 5 | 5-6 | 14 | Slightly Cloudy | Slightly Cloudy |
| Example 2 | 91 | 100 | 89 | 823 | 1 | 3 | 5 | 14 | Light, clear | Light, clear |
| Example 3 | 48 | 100 | 60 | 750 | 1 | 2 | 4 | 7 | Hazy, light | Hazy, light |
| Example 4 | 85 | 100 | 95 | 825 | 1-2 | 2-3 | 6 | 8 | Clear | Some Settling |
| Example 5 | 75 | 100 | 70 | 1175 | 2 | 4 | 5-6 | 5 | Hazy | Hazy |
| Example 6 | 86 | 100 | 94 | 1100 | 2 | 5 | 6 at 72 hours | 19 | Hazy | Hazy |
| Example 7 | 85 | 100 | 93 | 1125 | 1 | 5 | 5-6 at 72 hours | 28 | Hazy | Hazy at 72 hours |
| Example 8 | 80 | 100 | 95 | 1062 | 1 | 2 | 6 | 7 | Clear | ND |
| Example 9 | 54 | 100 | 43 | 765 | 2 | 4 | 5 | 13 | Slightly Cloudy | Slightly Cloudy |
| Example 10 | 75 | 100 | 95 | 825 | 1-2 | 2-3 | 6 | 8 | Clear | Some Settling |
| Example 11 | 75 | 100 | 65 | 810 | 1 | ND | ND | 7 | Hazy | ND |
| Example 12 | 70 | 100 | 85 | 762 | 1 | 2-3 | ND | 5 | Hazy | Settling |
| Example 13 | 80 | 100 | 60 | 1305 | 2 | 3 | 6 | 5 | Cloudy | Some settling |
| Example 14 | 60 | 100 | 40 | 1184 | 1 | 2 | 4 | 5 | Cloudy | cloudy |
| Control 1 | 15 | 70 | 50 | ND | ND | ND | ND | >5 | Cloudy | ND |
| Example 15 | 75 | 100 | 0 | 1362 | 1-2 | 4 | 6 | 6 | Cloudy | Cloudy |
| Example 16 | 90 | 100 | 5 | 1337 | 1-2 | 4 | 5 | 6 | Cloudy | Cloudy |
| Control 2 | 10 | 100 | 100 | 1300 | 4-5 | 6 | 7 | 11 | Cloudy | Particles |
| Example 17 | 50 | 100 | 10 | 2125 | 1-2 | 4 | 5 | 7 | Cloudy | Cloudy |
| Example 18 | 64 | 100 | 80 | 1908 | 2 | 5 | ND | 8 | Cloudy | Phase Separation. Settling |
| Control 3 | 21 | 100 | 85 | 1000 | 2 | 3 | ND | 12 | Cloudy | Seeded out within 48 hours |
| Control 4 | 83 | 100 | 80 | 1227 | 6 | ND | 7 at 72 hours | 30 | Cloudy | Gelled. Settled out |

*= ND = Not Determined

Example 19

A radiation curable hot melt adhesive composition was prepared by treating a composition that included 70.85% by weight of a 65% by weight propylene and 35% by weight butene-propylene-alpha-olefin copolymer having a viscosity of 6,500 cps at 190° C., 4.48% by weight A-C-X 1783 maleated linear low density polyethylene wax, 3.00% by weight adipic acid, and 0.45% by weight IRGANOX 1010 antioxidant with 1.0% by weight LUPEROX 101 organic peroxide under a vacuum that was pulling a pressure of about 29 inches of mercury (Hg) and at a temperature of from about 175° C. to about 190° C. for a period of about 45 minutes. The resulting reaction product was then combined with 3% by weight IRGACURE 184, 10.00% by weight EASTOTAC H-100E tackifying agent, 8.52% by weight N21 polyethylene wax, 1.20% by weight AC596 maleated polypropylene wax, and 0.50% by weight IRGANOX 1010 antioxidant.

The composition was then exposed to UV radiation having a wavelength of from 280 nm to 360 nm. The resulting composition was determined to have a Mw of 27,100 g/mole, a Mn of 3360, and a Mz of 64,500, and to exhibit an average tensile strength of 202 psi and 40% elongation.

All patents and references referred to herein are incorporated herein.

Other embodiments are within the claims.

What is claimed is:

1. A hot melt adhesive composition comprising:
   a first copolymer comprising the reaction product of
   a functionalized polyethylene,
   a propylene-alpha-olefin polymer comprising at least 50 mole % propylene and having a viscosity of no greater than 10,000 centipoise at 190° C., a ratio of z average molecular weight (Mz) to number average molecular weight (Mn) (Mz/Mn) of greater than 20, and a ratio of Mz to weight average molecular weight (Mw) (Mz/Mw) of greater than 3.0, and
   a free radical initiator.

2. The adhesive composition of claim 1 having a viscosity of no greater than 2,000 centipoise at 177° C.

3. The adhesive composition of claim 1 having a viscosity of from about 400 to about 2,000 centipoise at 177° C.

4. The adhesive composition of claim 1, wherein the adhesive composition exhibits a fiber tearing bond at −29° C. and at +60° C.

5. The adhesive composition of claim 1, wherein the adhesive composition exhibits at least about 50% fiber tear at −29° C. and at +60° C.

6. The adhesive composition of claim 1, wherein the first copolymer is formed from of at least 2% by weight of the functionalized polyethylene based on the weight of the first copolymer.

7. The adhesive composition of claim 1, wherein the first copolymer is formed from at least about 10% by weight of the functionalized polyethylene based on the weight of the first copolymer.

8. The adhesive composition of claim 1, wherein the first copolymer comprises the reaction product of at least about 2% by weight of maleated polyethylene and at least about 80% by weight of the propylene-alpha-olefin polymer.

9. The adhesive composition of claim 1, wherein the first copolymer comprises the reaction product of at least about 10% by weight maleated polyethylene and at least about 85% by weight of the propylene-alpha-olefin polymer.

10. The adhesive composition of claim 1, wherein the adhesive composition is homogeneous after aging for 96 hours at 177° C.

11. The adhesive composition of claim 1 exhibiting a single thermal melt transition temperature when tested using differential scanning calorimetry.

12. The adhesive composition of claim 1 exhibiting an initial Gardner color of no greater than 3.

13. The adhesive composition of claim 1 exhibiting a Gardner color after aging for 72hours at 177° C. of no greater than 5.

14. The adhesive composition of claim 1, wherein the free radical initiator comprises peroxide.

15. The adhesive composition of claim 1, wherein the propylene-alpha-olefin polymer comprises ethylene, butene, pentene, hexene, heptene, octene, nonene, decene, dodecene, or a combination thereof.

16. The adhesive composition of claim 1, wherein the propylene-alpha-olefin polymer comprises at least 25 mole % butene.

17. The adhesive composition of claim 1 further comprising Fischer Tropsch wax, polyethylene wax, polypropylene wax, maleated polypropylene wax, or a combination thereof.

18. The adhesive composition of claim 1, wherein the functionalized polyethylene comprises maleated polyethylene wax and the composition further comprises Fischer Tropsch wax, polyethylene wax, maleated polypropylene wax, or a combination thereof.

19. The adhesive composition of claim 1, wherein the functionalized polyethylene comprises maleated polyethylene wax and the composition further comprises Fischer Tropsch wax.

20. The adhesive composition of claim 18, further comprising an olefin polymer.

21. The adhesive composition of claim 1 further comprising at least about 5% by weight wax.

22. The adhesive composition of claim 1 further comprising at least about 5% by weight wax selected from the group consisting of polyethylene wax, maleated polypropylene wax, and Fischer Tropsch wax.

23. The adhesive composition of claim 1, wherein the adhesive composition exhibits a set time of less than 15 seconds.

24. The adhesive composition of claim 1, wherein the adhesive composition exhibits a set time of less than 10 seconds.

25. The adhesive composition of claim 1, wherein the first copolymer comprises the reaction product of at least about 2% by weight maleated polyethylene and at least about 80% by weight propylene-alpha-olefin polymer, the adhesive composition further comprising at least about 5% by weight wax and having a viscosity no greater than 2,000 centipoise at 177° C.

26. The adhesive composition of claim 1, exhibiting a Mz/Mn of greater than 18, and a Mz/Mw of from 2.3 to no greater than 6.

27. The adhesive composition of claim 1, exhibiting a Mz/Mn of at least 27 and a Mz/Mw of from 2.3 to no greater than 4.

28. The adhesive composition of claim 1 further comprising tackifying agent.

29. The adhesive composition of claim 1 further comprising from at least 15% by weight to about 30% by weight tackifying agent.

30. The adhesive composition of claim 1, wherein the first copolymer is formed from a reaction mixture comprising a polyfunctional acid.

31. The adhesive composition of claim 1 comprising at least about 55% by weight of the copolymer and further comprising a tackifying agent and a wax comprising Fischer Tropsch wax, polyethylene wax, polypropylene wax, maleated polypropylene wax, or a combination thereof.

32. The adhesive composition of claim 1 comprising at least about 70% by weight of the copolymer and further comprising a tackifying agent and a wax comprising Fischer Tropsch wax, polyethylene wax, polypropylene wax, maleated polypropylene wax, or a combination thereof.

33. A method of making a hot melt adhesive composition, the method comprising:
    heating a mixture comprising
    at least 80% by weight propylene-alpha-olefin polymer comprising at least 50 mole % propylene, the propylene-alpha-olefin polymer having a viscosity of no greater than 10,000 centipoise at 190° C., a ratio of z average molecular weight (Mz) to number average molecular weight (Mn) (Mz/Mn) of greater than 20, and a ratio of Mz to weight average molecular weight (Mw) (Mz/Mw) of greater than 3.0,
    functionalized polyethylene, and
    a free radical initiator.

34. The method of claim 33, wherein the functionalized polyethylene comprises functionalized polyethylene wax.

35. The method of claim 33, wherein the functionalized polyethylene comprises maleated polyethylene wax and the mixture comprises at least about 2% by weight of the maleated polyethylene wax.

36. The method of claim 33, wherein the hot melt adhesive composition exhibits a fiber tearing bond at −29° C. and at +60° C.

37. The method of claim 33, wherein the mixture further comprises a polyfunctional acid.

38. A hot melt adhesive composition comprising:
a copolymer comprising the reaction product of
a functionalized polyethylene,
a propylene-alpha-olefin polymer comprising at least 50 mole % propylene, and
a free radical initiator,
the hot melt adhesive composition exhibiting a ratio of z average molecular weight (Mz) to number average molecular weight (Mn) (Mz/Mn) of greater than 18, and a ratio of Mz to weight average molecular weight (Mw) (Mz/Mw) of from 2.3 to no greater than 6.

39. The hot melt adhesive composition of claim 38, wherein the Mz/Mn is at least 27 and the Mz/Mw is from 2.5 to no greater than 6.

40. The hot melt adhesive composition of claim 38, wherein the adhesive composition exhibits at least about 50% fiber tear at −29° C. and at +60° C.

41. The hot melt adhesive composition of claim 38, wherein the functionalized polyethylene comprises functionalized polyethylene wax.

42. The hot melt adhesive composition of claim 1 further comprising filler.

* * * * *